United States Patent
Singh et al.

(10) Patent No.: US 9,839,877 B2
(45) Date of Patent: Dec. 12, 2017

(54) REAGENT DOSER DIAGNOSTIC SYSTEM AND METHOD

(71) Applicant: Cummins Emission Solutions Inc., Columbus, IN (US)

(72) Inventors: Balbahadur Singh, Greenwood, IN (US); Clyde W. Xi, Columbus, IN (US); Mickey R. McDaniel, Greenwood, IN (US); Baohua Qi, Columbus, IN (US); Paul C. McAvoy, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 363 days.

(21) Appl. No.: 14/050,557

(22) Filed: Oct. 10, 2013

(65) Prior Publication Data
US 2015/0104363 A1    Apr. 16, 2015

(51) Int. Cl.
*B01D 53/94* (2006.01)
*F01N 3/20* (2006.01)
*F01N 11/00* (2006.01)

(52) U.S. Cl.
CPC .......... *B01D 53/9495* (2013.01); *F01N 3/20* (2013.01); *F01N 3/208* (2013.01); *F01N 11/00* (2013.01); *F01N 2550/05* (2013.01); *F01N 2610/02* (2013.01); *F01N 2900/1808* (2013.01); *F01N 2900/1822* (2013.01); *Y02T 10/24* (2013.01); *Y02T 10/47* (2013.01)

(58) Field of Classification Search
CPC ...... F01N 3/208; F01N 11/00; F01N 2550/05; F01N 2610/02; F01N 29/1822; F01N 3/20; Y02T 10/24; Y02T 10/47; B01D 53/9495

USPC ........................................... 423/212; 422/112
See application file for complete search history.

(56) References Cited

U.S. PATENT DOCUMENTS

| | | | |
|---|---|---|---|
| 5,020,362 | A | 6/1991 | Hart et al. |
| 5,445,019 | A | 8/1995 | Glidewell et al. |
| 7,543,485 | B2 | 6/2009 | Chemello |
| 8,104,334 | B2 * | 1/2012 | Wang ............... F02D 41/222 73/114.43 |
| 8,118,006 | B2 | 2/2012 | Pursifull |
| 8,495,862 | B2 | 7/2013 | Levijoki et al. |
| 8,800,265 | B2 | 8/2014 | Gonze et al. |
| 2011/0239625 | A1 * | 10/2011 | Fokkelman ............ F01N 3/206 60/274 |
| 2013/0098003 | A1 * | 4/2013 | Pietraszek ............ B01D 53/90 60/286 |

(Continued)

FOREIGN PATENT DOCUMENTS

| CN | 102434258 | 5/2012 |
|---|---|---|
| CN | 102444458 | 5/2012 |

(Continued)

OTHER PUBLICATIONS

European Search Report for EP14187520.3 dated Feb. 26, 2015, 6 pages.

(Continued)

*Primary Examiner* — Rebecca M Fritchman
(74) *Attorney, Agent, or Firm* — Foley & Lardner LLP

(57) ABSTRACT

Systems and methods are disclosed for determining or diagnosing a reagent dosing system failure to provide sufficient reagent to an exhaust aftertreatment system that includes an SCR catalyst to satisfy a reagent dosing command.

10 Claims, 3 Drawing Sheets

(56) References Cited

U.S. PATENT DOCUMENTS

2013/0186470 A1 7/2013 Offenhuber et al.
2015/0075143 A1* 3/2015 Gong ..................... F01N 3/208
                                                          60/301

FOREIGN PATENT DOCUMENTS

| DE | 10 2011 078 870 | 7/2012 |
| DE | 10 2011 076 955 | 12/2012 |
| DE | 10 2012 200 917 | 7/2013 |

OTHER PUBLICATIONS

First Chinese Office Action issued for Chinese Patent Application No. 201410529537.7, dated Sep. 4, 2017, 5 pages.

\* cited by examiner

REAGENT DOSER DIAGNOSTIC SYSTEM AND METHOD

BACKGROUND

Selective catalytic reduction ("SCR") exhaust aftertreatment systems are an important technology for reducing NOx emissions from internal combustion engines such as diesel engines. SCR systems generally include a source of reagent such as a urea solution, a dosing system for pressurizing the urea solution and for providing a controlled amount or rate of urea solution to an SCR catalyst, and an injector which provides urea solution to a urea decomposition region of an exhaust flowpath located upstream from an SCR catalyst. Many SCR systems also utilize pressurized gas to assist the flow of urea solution to the injector.

While providing important reductions in NOx emissions, SCR systems suffer from a number of shortcomings and problems. Use of urea solutions in SCR systems may result in growth of urea crystals or deposits on various components of the system which may disrupt their operation. Injector nozzles may become blocked due to, for example, formation of urea deposits when urea solution is exposed to elevated temperatures. One or more portions of the system may be crimped, blocked or non-functional, either intentionally or unintentionally. These and other conditions result of the dosing system in insufficient reagent being injected into the exhaust stream for the treatment of NOx emissions by the SCR catalyst.

Existing techniques have been developed to monitor urea usage in SCR systems and predict or determine a fault condition of the dosing system. One technique compares the volume of reagent commanded over a time period by integrating the commanded reagent flow rate over the time period, and then comparing this commanded volume to the volume of reagent consumed from the storage tank. However, these techniques are not reliable and are prone to indicating false failures due to many factors which cannot be controlled by the supplier of the dosing system, such as operator re-fill behavior, reagent tank geometry, reagent fluid level sensor resolution, and reagent tank overfill volume. Another technique involves placing a flow meter and associated sensing hardware to provide a real time measurement of the flow rate, which is then compared to the commanded flow rate. However, this techniques requires additional expense in the dosing system both in terms of initial hardware cost and maintenance and repair costs over time. There is a long felt need for advancements mitigating these and other shortcomings associated with monitoring and diagnosing faults in reagent dosing systems.

SUMMARY

One embodiment is a unique method for determining or diagnosing a reagent dosing system failure in providing sufficient reagent to an exhaust aftertreatment system that includes an SCR catalyst to satisfy a reagent dosing command for treatment of emissions in the exhaust with the SCR catalyst. Other embodiments include unique methods and systems for reagent dosing system diagnostics. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF EXEMPLARY EMBODIMENTS

Figure 1:
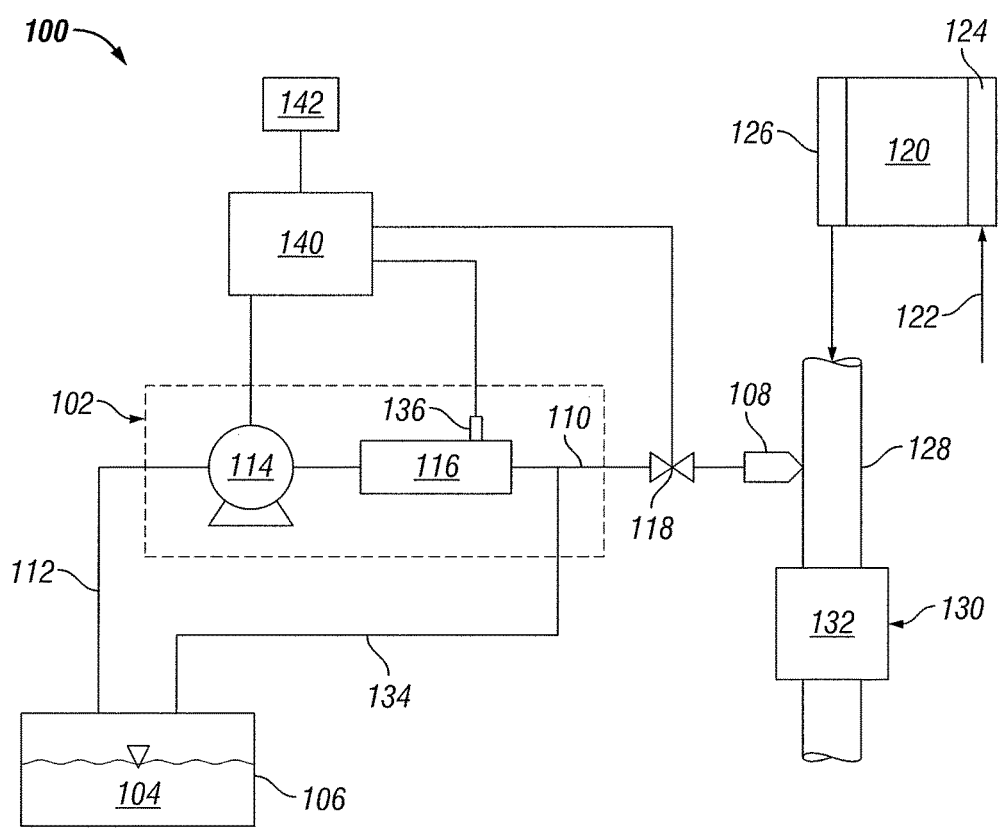
FIG. 1 is a schematic of an exemplary reagent dosing diagnostic system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1 there is illustrated an exemplary reagent dosing system 100 for injection of reagent into an exhaust aftertreatment system 130. Reagent dosing system 100 may be provided on a vehicle (not shown) powered by an internal combustion engine 120 such as a diesel engine, or on an engine utilized in other applications such power generation or pumping systems. Engine 120 includes an intake manifold 124 fluidly connected to an intake system 122 that receives fresh air flow and, in some embodiments, recirculated exhaust gas to provide a charge flow to a plurality of cylinders (not shown) of engine 120. After mixing of the charge flow with fuel and combustion in the combustion chambers of the cylinders, exhaust gas that is produced is provided to exhaust manifold 126. Exhaust manifold 126 is fluidly connected to an exhaust system 128 so that at least a portion of the exhaust gas is transported to aftertreatment system 130.

Reagent dosing system 100 includes a doser 102 that receives a reagent 104 from a storage tank 106 and provides the reagent to injector 108 or other structure for injection or delivery to a decomposition chamber or directly to the exhaust system 128. One example of a suitable reagent is a diesel exhaust fluid (DEF) which comprises a solution of 32.5% high purity urea and 67.5% deionized water. It shall be appreciated, however, that any suitable reagent for injection into an exhaust system with dosing system 100 may also be utilized.

In the illustrated embodiment the exhaust system 128 provides exhaust gas to an aftertreatment system 130 having one or more SCR catalysts 132. Exhaust system 128 includes one or more locations for receiving a reagent from reagent dosing system 100. The aftertreatment system 130 may include one or more other aftertreatment components not shown, such as one or more oxidation catalysts, one or more particulate filters, an ammonia oxidation catalyst, and various temperature, pressure and exhaust gas constituent sensors. Exhaust system 128 may also include various components not shown, such as one or more EGR systems, one or more turbocharger systems, intercoolers, aftercoolers, throttles, control valves, and other components. Reagent injector 108 is mounted on a portion of exhaust system 128 upstream of SCR catalyst 132 with its outlet, such as a nozzle located within the exhaust conduit, arranged to spray aqueous atomized reagent into the exhaust system where it mixes with engine exhaust gas produced by the engine 120. SCR catalyst 132 promotes a chemical reaction between the reagent and NOx in the exhaust gas that converts substantial amounts of NOx to reduce NOx emissions before the exhaust gas passes into the atmosphere.

Dosing system 100 may include various structures to facilitate receipt of reagent from storage tank 106 and the delivery of the reagent to the exhaust system 128. For example, doser 102 can include a reagent suction line 112 that is configured to draw reagent 104 from storage tank 106. Storage tank 106 holds a supply of aqueous reagent 104 and is vented to allow reagent to be withdrawn through reagent suction line 112 to doser 102. Doser 102 can further include an accumulator 116 configured to maintain an accumulated quantity of reagent under pressure sufficient to ensure proper atomization and mixing of the reagent when injected into the exhaust carried by exhaust system 128. Doser 102 also includes a pump 114 that, except as discussed below, pressurizes the reagent in accumulator 116 to maintain a constant reagent pressure during and between dosing cycles. A pressure sensor 136 is in fluid communication with reagent in accumulator 116. A control valve 118 is configured to actuate a measured amount of flow of reagent 104 through a reagent supply line 110 to injector 108 for injection into the exhaust. In other embodiments, reagent supply line 110 may include a throttle, a filler, a check valve, and other components. Dosing system 100 further includes a reagent return line 134 that is configured to provide a controlled flow of reagent from downstream of accumulator 116 back to storage tank 106 to allow for stable pump control.

While FIG. 1 shows one example of a dosing system 100, other configurations and components not shown are possible. For example, pump 114 can be in the form of a diaphragm pump, though it shall be appreciated that other types of pumps may be utilized. Check valves can be located between various components. Pulsation dampeners, filters, and metering devices can provided within doser 102. Doser 102 may further include a bypass line around the pump 114 having a bypass valve which is operable to open and close to permit or prevent the flow of reagent through the bypass line to a location where it may be returned to the storage tank 106, for example, during a purging operation. Doser 102 may further include an air assist arrangement to receive compressed air in a blending chamber that receives reagent from the metering valve at a controllable rate. The blending chamber may also receive a flow of pressurized air from an air supply (not shown) and discharges a combined flow of pressurized air and reagent at an outlet of doser 102. The air supply may be integral to a vehicle, integral to engine 120, or may be an air supply dedicated to dosing system 100. It shall be understood that additional embodiments may utilize pressurized gases other than air, for example, combinations of one or more inert gases. Reagent dosing system 100 may be further connected with a heat exchange system (not shown) through which a heat exchange fluid, such as engine coolant, is circulated by a pump.

Reagent dosing system 100 may be controlled and monitored by a controller 140 such as an engine control module (ECM) and/or a doser control module (DCM). It shall be appreciated that the controller or control module may be provided in a variety of forms and configurations including one or more computing devices having non-transitory memory storing computer executable instructions, processing, and communication hardware. It shall be further appreciated that controller may be a single device or a distributed device, and the functions of the controller may be performed by hardware or software.

Controller 140 is operatively coupled with and configured to store instructions in a memory which are readable and executable by controller 140 to control doser 102, pump 114 and control valve 118 to provide a commanded quantity of reagent 104 at a commanded flow rate and pressure to injector 108. Controller 140 is also operatively coupled to and may receive signals from, for example, pressure sensor 136 of doser 102. Pressure sensor 136 is operable to provide a signal indicating the pressure of the reagent 104 in accumulator 116 downstream of pump 114 before entry into reagent supply line 110. The pressure at this location may be pressure of a combined flow of pressurized air and reagent, or the pressure of reagent 104 alone, in accumulator 116. Additional pressure sensors and one or more temperature sensors may be provided and operable to provide a signal to controller 140 indicating the temperature and/or pressure of reagent at a location downstream or upstream of pump 114.

Controller 140 is structured to perform certain operations to diagnose an ability of dosing system 100 to provide an appropriate quantity of reagent over a dosing cycle to satisfy a dosing command determined by controller 140 for treatment of emissions in the exhaust. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. In certain embodiments, the controller 140 includes one or more modules structured to functionally execute the operations of the controller in hardware and/or software on computer readable medium, and may be distributed across various hardware or software components. More specific descriptions of certain embodiments of controller configurations and operations are included in the discussion that follows.

The controller 140 is in communication with any component of the system to gather information, process the information, provide commands, and control operations of certain components. Controller 140 is further connected to an output device 142. Output device 142 can be any suitable device for displaying a result of the dosing system diagnostic to a user, operator, service technician, or other party, and can include an indicator lamp, a gauge, a printer, a memory device, an audible alarm, and/or other suitable output device. The controller 140 includes stored data values, constants, and functions, as well as operating instructions stored on computer readable medium. Any of the operations of exemplary procedures described herein may be performed at least partially by the controller 140.

Figure 3:
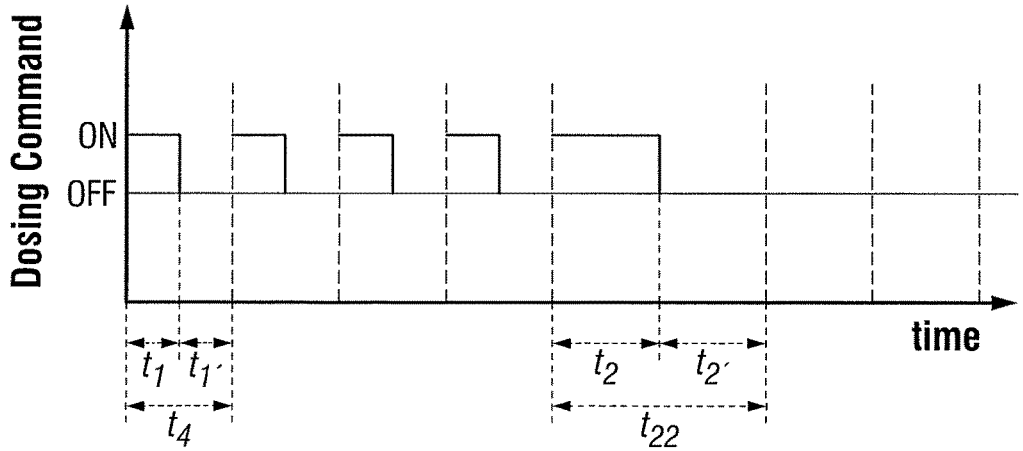
FIG. 3 is a chart showing an example dosing cycle of the reagent dosing system that includes a number of dosing periods and a diagnostic dosing period.

Referring to FIG. 3, during normal operation of system 100, a predetermined quantity of reagent 104 calculated by controller 140 is supplied to exhaust system 128 by dosing system 100 during a dosing cycle to satisfy a dosing command. Each dosing cycle t includes a number of dosing periods $t_{11}$ in which control valve 118 is opened to initiate a dosing on-time $t_1$ and then closed at the end of the dosing on-time $t_1$ for the remainder of the dosing period $t_{11}$. Dosing period $t_{11}$ is fixed during normal operation and dosing ontime $t_1$ is varied to achieve commanded dosing rate. The ratio of dosing on-time $t_1$ versus dosing period $t_{11}$ determines the dosing rate. Dosing period $t_{11}$ is defined as a total of dosing ontime $t_1$ plus dosing off-time $t_1'$. As used herein the dosing on-time $t_1$ is the length of time from when control valve 118 is opened to when control valve 118 is closed during each dosing period $t_{11}$ of the dosing cycle. The dosing off-time $t_1'$ is the length of time the control valve 118 is closed during the dosing period $t_{11}$.

During normal operation the pressure of reagent 104 is maintained by pump 114 at a predetermined operating pressure during the dosing cycle. When control valve 118 is actuated on and off to provide reagent to injector 108 in each dosing period of the dosing cycle for dosing into the exhaust system 128, controller 140 uses a pressure measurement from pressure sensor 136 as an input for closed loop control of pump 114 to maintain the predetermined operating pressure. Controller 140 modulates the speed of pump 114 in real time to maintain an average pressure for reagent in accumulator 116 that approximates the predetermined operating pressure. Thus, when control valve 118 is opened, the pressure of system 100 at accumulator 116 drops below the predetermined operating pressure, which causes controller 140 to provide a signal to immediately increase the speed of pump 114, thus immediately increasing the actual pressure toward the predetermined operating pressure. When control valve 118 is closed, the actual pressure in accumulator 116 increases until pump 114 is commanded by controller 140 to reduce its speed and allow the actual pressure to be maintained at the predetermined operating pressure.

Figure 2:
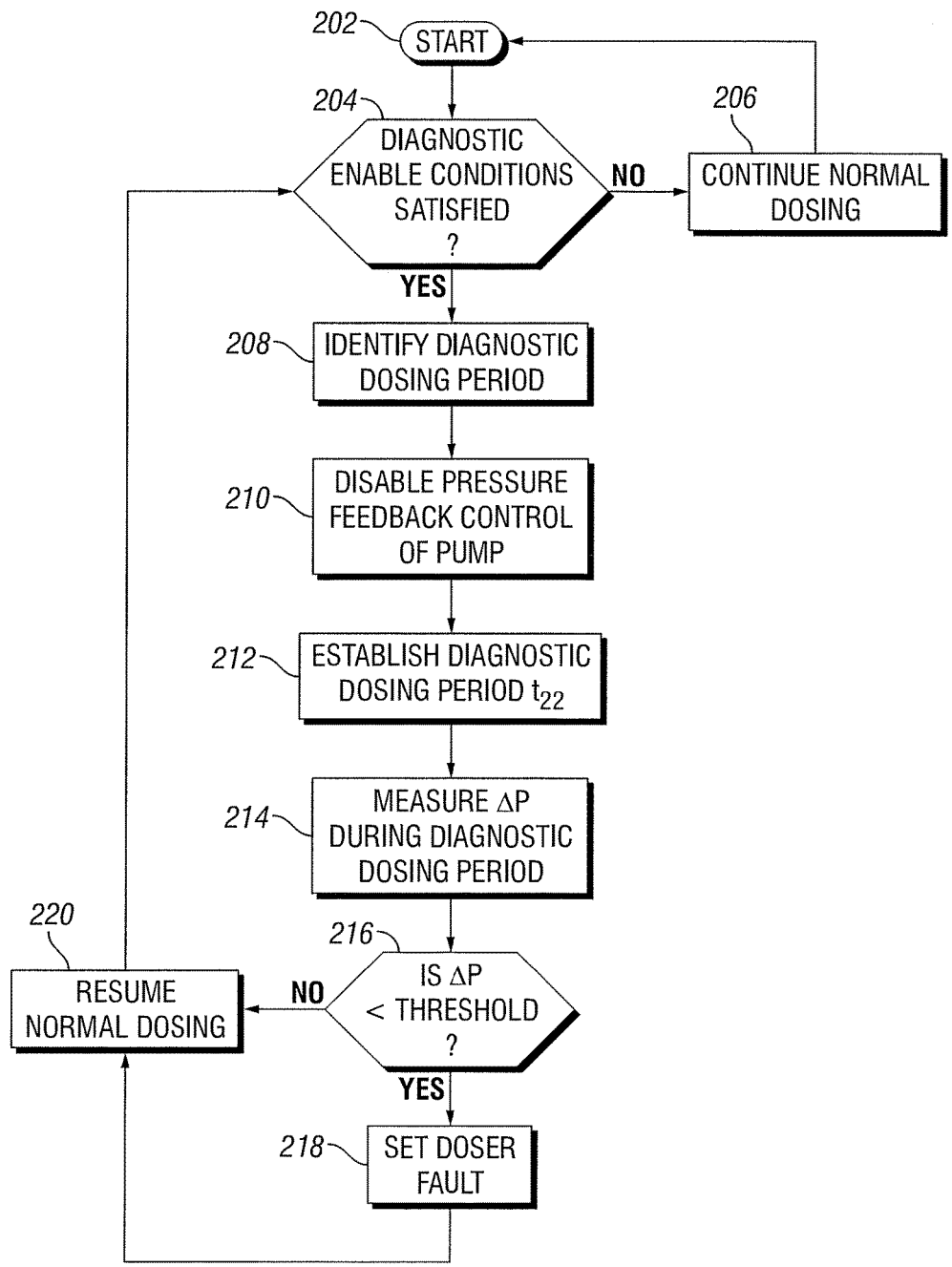
FIG. 2 is a flow diagram of reagent dosing system diagnostic procedure.
Figure 4:
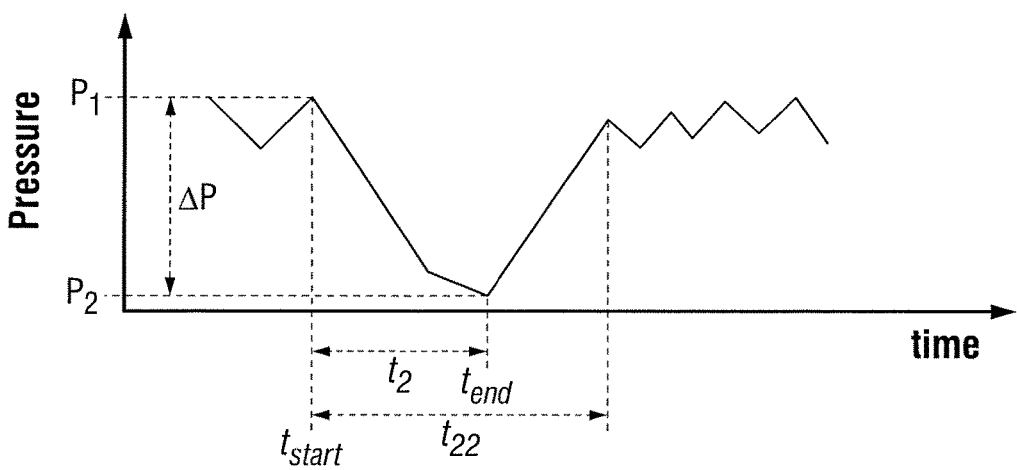
FIG. 4 is a chart showing an exemplary pressure drop during a doser on-time of a diagnostic dosing period of the dosing cycle.

Referring now to FIG. 2, there is shown a procedure 200 for operation of controller 140 to diagnose a malfunction of dosing system 100 using the pressure readings from pressure sensor 136 during a dosing cycle. Procedure 200 involves configuring controller 140 to identify a diagnostic dosing period $t_{22}$ in the dosing cycle, and to suspend the pressure feedback control of pump 114 at the start of the diagnostic dosing period $t_{22}$ in the dosing cycle while maintaining pump 114 at a constant speed and lengthening the doser on-time $t_2$ (FIG. 3.) The average dosing rate is held constant by increasing the dosing period $t_{22}$ which automatically increases doser on-time $t_2$, keeping the ratio between dosing period $t_{22}$ and dosing on-time $t_2$ same. As shown in FIG. 4, controller 140 measures the pressure drop ΔP between start pressure P1 at the start $t_{start}$ of the diagnostic dosing period $t_{22}$ and the end pressure P2 at the end $t_{end}$ of the dosing on-time $t_2$ of the diagnostic dosing period $t_{22}$. If the pressure drop ΔP is less than a predetermined threshold, then a dosing system malfunction or fault can be communicated by controller 140 to output device 142.

During operation of reagent dosing system 100, blockages can cause certain failure modes that indicate a deviation between commanded reagent dosing quantity over a dosing cycle and the actual quantity of reagent that is dosed. Deviations above a certain threshold can significantly impact that ability of reagent dosing system 100 to supply sufficient reagent 104 for effective catalyst operation in reducing NOx emissions. One such failure mode is caused by a partial blockage of one or more portions of dosing system 100 downstream of pump 114. These failure modes can be caused by crimps in reagent pressure line 110, such as may be created by deliberate tampering with the system or kinks created by poor installation practices. Blockage of one or more outlet holes of injector 108 can be created by soot or other particles and effect the ability of injector 108 to deliver the commanded quantity of reagent 104. The control valve 118 or other filter or component of dosing system 100 can also become obstructed, preventing full or proper opening. Insufficient drive currents to control valve 118 may also result in improper opening and failure to provide the commanded reagent quantity. Controller 140, configured to operate to perform diagnostic procedure 200, can determine a dosing system fault condition and if a failure is detected provide an output indicating the same so that service or other restorative action can be taken.

Procedure 200 uses the pressure readings from pressure sensor 136 and a modified diagnostic dosing period $t_{22}$ that is lengthened as compared to the other dosing periods $t_{11}$ in the dosing cycle in order to complete the diagnostic of dosing system 100. As a result, the supply of reagent to exhaust system 128 can continue during the diagnostic, and the quantity of reagent commanded by controller 140 to be supplied during the dosing periods $t_{11}$ is still provided during the diagnostic dosing period $t_{22}$. Thus, a dosing cycle in which the diagnostic is completed still provides the commanded quantity of reagent to satisfy the dosing command (provided the dosing system is properly functioning), minimizing or eliminating any impact of the diagnostic on aftertreatment system 130 in treating emissions and maintaining overall aftertreatment system performance.

Procedure 200 starts at 202 in response to, for example, a key-on event or other start indicator. Procedure 200 continues at conditional 204 to determine whether diagnostic enable conditions are satisfied. At certain operating conditions of the engine 120, exhaust system 128 and/or reagent dosing system 100, the ability to accurately measure reagent pressure conditions are compromised. Various examples of enable conditions that may be considered before initiating the reagent consumption diagnostic are listed hereinbelow. Satisfaction of each of these conditions may not be necessary in every embodiment of the present system and method, nor are the diagnostic enable conditions necessarily limited to the conditions disclosed herein.

One diagnostic enable condition includes the dosing system 100 pressures being within normal limits and there are no known errors with low pressure or unstable pressures in dosing system 100. Another condition is that a pre-calibrated amount of reagent has been dosed with reagent dosing system 100 since key-on to prevent the diagnostic from running when air is trapped in dosing system 100 since trapped air may result in abnormal pressure signatures. Other diagnostic enable conditions may include the time elapsed or amount of reagent dosed since the previous diagnostic, or the time elapsed or amount of reagent dosed since a filling of tank 106. If at operation 204 one or more the diagnostic enable conditions are not satisfied, procedure 200 continues at operation 206 to continue normal dosing according to preprogrammed instructions in controller 140. Procedure 200 can then return to start 202 and continue to monitor operational characteristics until a key-off event or until reagent consumption diagnostic conditions are enabled at conditional 204.

If diagnostic conditions are enabled at conditional 204, procedure 200 continues at operation 208 in which a diagnostic dosing period $t_{22}$ is identified from one of the dosing periods $t_{11}$ in the dosing cycle. Procedure 200 then continues at operation 210 in which the pressure feedback control of pump 114 is disabled. After operation 210 procedure 200 continues at operation 212 in which the length of the dosing on-time t2 and the length of during the diagnostic dosing period t22 is established so that the reagent dosing quantity of each dosing period in the dosing cycle required for operation of the aftertreatment system can be delivered despite the lack of pressure feedback control of pump 114. In one embodiment, dosing on-time $t_2$ and diagnostic dosing period $t_{22}$ are calculated by controller 140 based on actual operating conditions and the reagent dosing command. In other embodiments, dosing on-time $t_2$ and diagnostic dosing period $t_{22}$ are pre-determined and programmed into controller 140. After operation 212 the diagnostic dosing period is initiated at operation 214 and the change in pressure ΔP during the doser on-time t2 is determined from pressure sensor 136 while pump 114 is operated at a constant speed. Since the speed of pump 114 is held constant, when control valve 118 is opened at pressure P1, reagent dosing system 100 will lose pressure over time and settle to a new lower pressure P2 based on the amount of reagent that is delivered.

From operation 214 procedure 200 continues at conditional 216 where the pressure drop ΔP is compared to a predetermined threshold. If the pressure drop ΔP is more than the predetermined threshold, then dosing system 100 is considered to be functioning normally and procedure 200 continues to resume normal dosing at operation 220. The amount of pressure drop expected by a normally operating system is predetermined and compared to the actual pressure drop ΔP. The amount of pressure drop ΔP over time is inversely proportional to the amount of blockage present in reagent dosing system 100. For example, an actual pressure drop that is less than the predetermined pressure drop indicates a system blockage. If the pressure drop ΔP is less than a predetermined threshold, then procedure 200 continues at operation 218 and sets a doser fault, which can be communicated via output device 142. After setting of the doser fault, procedure 200 can continue at operation 220 to resume normal dosing. Additionally or alternatively, procedure 200 can initiate a de-rate of engine 120 or other system component to incentivize the operator to obtain service. Procedure 200 includes increasing the doser on-time by increasing the diagnostic dosing period during the diagnostic, as compared to the doser on-time of the normal dosing periods in the normal dosing cycle so that same quantity of the reagent is injected during the diagnostic dosing period and a reliable diagnostic decision can be made. The regular dosing period does not provide a reliable pressure drop to be able to diagnose insufficient dosing quantity. During the increased diagnostic dosing period and increased diagnostic on-time, the difference between consecutive injector on/off events is substantial enough to observe reliable pressure drop and perform a reliable diagnostic.

Various aspects of the systems and methods disclosed herein are contemplated. According to one aspect, a method includes determining a quantity of a reagent to inject with a dosing system over a dosing cycle to treat an exhaust gas in an exhaust system that includes a selective catalytic reduction catalyst. The dosing cycle includes a plurality of dosing periods and a doser on-time and a doser off-time within each dosing period, and a predetermined portion of the quantity of the reagent is injected during the dosing on-time of each dosing period. The method also includes operating the dosing system to inject the quantity of the reagent into the exhaust system during the dosing cycle. Operating the dosing system includes controlling a pump of the dosing system with pressure feedback control to maintain an operating pressure of the dosing system when the injector is opened. The method further includes identifying a diagnostic dosing period from the dosing periods in the dosing cycle; during the diagnostic time period, suspending pressure feedback control of the pump while maintaining a speed of the pump; measuring a pressure drop of the dosing system downstream of the pump during the doser on-time of the diagnostic dosing period; and determining a fault condition of the dosing system in providing the quantity of the reagent in response to the pressure drop measured during the diagnostic dosing period.

In one embodiment, the method further includes increasing the doser on-time of the diagnostic dosing period from the doser on-time of the other dosing periods in the dosing cycle so that the predetermined portion of the quantity of the reagent is injected during the diagnostic dosing period. In one refinement of this aspect, the method also includes setting a length of the diagnostic dosing period so that a ratio of the doser on-time in the diagnostic dosing period to the length of the diagnostic dosing period is substantially the same as a ratio of the doser on-time to length of the other dosing periods in the dosing cycle.

In another embodiment of the method, the reagent is a urea solution and is stored in a storage tank that is fluidly connected to the dosing system. In yet another embodiment, determining the fault condition includes determining a fault with the dosing system when the pressure drop is less than a predetermined threshold. In a further embodiment, the method includes determining at least one enable condition is met before identifying the diagnostic dosing period. In one embodiment, the at least one enable condition includes at least one of: a time since a previous determination of a fault condition; a temperature of the reagent; an amount of reagent injected since a fill event of a storage tank connected to the dosing system; and a minimum exhaust flow rate.

In another aspect, a method includes injecting a quantity of a reagent with a dosing system over a dosing cycle in response to a dosing command to treat an exhaust gas in an exhaust system that includes a selective catalytic reduction catalyst. The dosing system includes a pump operating via feedback control to maintain a generally stable pressure of the reagent downstream of the pump during the dosing cycle. Injecting the quantity of the reagent includes suspending pressure feedback control of the pump during a diagnostic dosing period within the dosing cycle while maintaining a pump speed; injecting a portion of the quantity of the reagent while suspending pressure feedback control during the diagnostic dosing period; and determining a fault condition of the dosing system in satisfying the dosing command in response to a pressure drop of the dosing system during the diagnostic dosing period.

In one embodiment, each dosing cycle includes a plurality of dosing periods and a doser on-time within each dosing period, and the doser on-time is determined by an opening and subsequent closing of an injector of the dosing system in the corresponding dosing period. In one refinement of this embodiment, the diagnostic dosing period is selected from the plurality of dosing periods in the dosing cycle and each of the dosing periods and the diagnostic dosing period provides a predetermined portion of the quantity of the reagent. In a further refinement, the method includes setting a length of the diagnostic dosing period so that a ratio of the doser on-time in the diagnostic dosing period to the length of the diagnostic dosing period is substantially the same as a ratio of the doser on-time to length of dosing period of the other dosing periods in the dosing cycle. In another embodiment, the doser on-time in the diagnostic dosing period is longer than the doser on-time in the other dosing periods of the dosing cycle.

In another embodiment of the method, the reagent is a urea solution that is stored in a storage tank fluidly connected to the dosing system. In yet another embodiment, the method includes determining at least one enable condition is met before initiating the diagnostic dosing period.

According to another aspect, a system includes a storage tank for storing a reagent and a doser fluidly connected to the storage tank to receive reagent from the storage tank. The doser is connected to an exhaust system and the doser includes a pump operable to pressurize the reagent while injecting a predetermined quantity of the reagent into the exhaust system over a dosing cycle to satisfy a dosing command. The system also includes a pressure sensor associated with the doser operable to indicate a pressure of the reagent downstream of the pump and a controller connected to the pump that is configured to operate the pump via feedback control from the pressure sensor to maintain a pressure of the reagent during the dosing cycle. The controller is further configured to identify a diagnostic dosing period in the dosing cycle during which to diagnose a fault condition of the dosing system in satisfying the dosing command; suspend feedback control of the pump and maintain a constant speed of the pump while injecting reagent during the diagnostic dosing period; and determine a fault condition of the dosing system in response to a pressure drop measured by the pressure sensor during the diagnostic dosing period.

In one embodiment, the doser further includes an accumulator downstream of the pump and the pressure sensor is connected to the accumulator. In another embodiment, the doser is connected to an injector that is coupled to the exhaust system and operably connected to the controller. In yet another embodiment, the controller is configured to determine the fault condition of the dosing system is failed when pressure drop is less than a predetermined threshold.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for diagnosing a dosing system failure to provide sufficient reagent to an exhaust system to satisfy a dosing command, the method comprising:
   determining, by a controller, a quantity of a reagent to inject with a dosing system over a dosing cycle to treat an exhaust gas in an exhaust system that includes a selective catalytic reduction catalyst, wherein the dosing cycle includes a dosing period having a doser on-time and a doser off-time, wherein a predetermined portion of the quantity of the reagent is injected during the dosing on-time of the dosing period;
   operating, by the controller, the dosing system to inject the quantity of the reagent into the exhaust system for a duration of the dosing cycle, wherein operating the dosing system includes controlling a pump of the dosing system with pressure feedback control to maintain an operating pressure of the dosing system when the injector is opened;
   identifying, by the controller, a diagnostic dosing period based on the doser on-time and the doser off-time by maintaining a constant dosing rate and increasing the doser on-time, the diagnostic dosing period being longer than the dosing period;
   operating, by the controller, the dosing system to inject the quantity of reagent into the exhaust system for a duration of the diagnostic dosing period, wherein during the duration of the diagnostic dosing period, pressure feedback control of the pump is suspended while maintaining a speed of the pump and increasing the doser on-time to dose the predetermined portion of the quantity of the reagent for the diagnostic dosing period;
   measuring a pressure drop of the dosing system downstream of the pump during the increased doser on-time of the diagnostic dosing period; and
   determining, by the controller, a fault condition of the dosing system in providing the quantity of the reagent in response to the pressure drop measured during the diagnostic dosing period being less than a predetermined threshold value.

2. The method of claim 1, further comprising setting a length of the diagnostic dosing period so that a ratio of the increased doser on-time in the diagnostic dosing period to the length of the diagnostic dosing period is the same as a ratio of the doser on-time for the dosing period to a length of the dosing period in the dosing cycle.

3. The method of claim 1, wherein the reagent is a urea solution and further comprising storing the reagent in a storage tank that is fluidly connected to the dosing system.

4. The method of claim 1, further comprising determining, by the controller, at least one diagnostic enable condition is met before identifying the diagnostic dosing period, the at least one diagnostic enable condition includes at least one of: a time elapsed since a previous determination of a fault condition; a pre-calibrated amount of reagent injected since a fill event of a storage tank connected to the dosing system; or a minimum exhaust flow rate.

5. A method for diagnosing a dosing system failure to provide sufficient reagent to an exhaust system to satisfy a dosing command, the method comprising:
   injecting, during a dosing period, a quantity of a reagent with a dosing system over a dosing cycle in response to a dosing command to treat an exhaust gas in an exhaust system that includes a selective catalytic reduction catalyst, wherein the dosing system includes a pump operating via feedback control to maintain a generally stable pressure of the reagent downstream of the pump during the dosing cycle, wherein injecting the quantity of the reagent includes:
   suspending, during a diagnostic dosing period, pressure feedback control of the pump within the dosing cycle while maintaining a pump speed, the diagnostic dosing period based on a doser on-time and doser off-time of a dosing period of the dosing cycle, the diagnostic dosing period being longer than the dosing period;
   injecting, during the diagnostic dosing period, a portion of the quantity of the reagent while suspending pressure feedback control by increasing the doser on-time; and
   determining, by a controller, a fault condition of the dosing system in satisfying the dosing command in response to a pressure drop of the dosing system during the diagnostic dosing period.

6. The method of claim 5, wherein the doser on-time is determined by an opening and subsequent closing of an injector of the dosing system in the dosing period.

7. The method of claim 6, wherein the diagnostic dosing period and the dosing period inject a same amount of the quantity of the reagent.

8. The method of claim 7, further comprising setting a length of the diagnostic dosing period so that a ratio of the increased doser on-time in the diagnostic dosing period to the length of the diagnostic dosing period is the same as a ratio of the doser on-time for the dosing period to a length of the dosing period in the dosing cycle.

9. The method of claim 5, wherein the reagent is a urea solution that is stored in a storage tank fluidly connected to the dosing system.

10. The method of claim 5, further comprising determining, by the controller, at least one diagnostic enable condition is met before initiating the diagnostic dosing period, the at least one diagnostic enable condition includes at least one of: a time elapsed since a previous determination of a fault condition; a pre-calibrated amount of reagent injected since a fill event of a storage tank connected to the dosing system; or a minimum exhaust flow rate.

\* \* \* \* \*